United States Patent [19]

Rayner

[11] Patent Number: 5,027,151
[45] Date of Patent: Jun. 25, 1991

[54] FILM TRANSPARENCY HOLDER

[75] Inventor: Robert W. Rayner, Hertfordshire, England

[73] Assignee: Crosfield Electronics Ltd., England

[21] Appl. No.: 568,153

[22] Filed: Aug. 16, 1990

[30] Foreign Application Priority Data

Aug. 30, 1989 [GB] United Kingdom ............... 8919617

[51] Int. Cl.$^5$ ..................... G03B 27/52; G03B 27/62
[52] U.S. Cl. ........................................ 355/30; 355/75
[58] Field of Search ...................... 355/30, 75, 76, 77, 355/125; 354/88; 358/487

[56] References Cited

U.S. PATENT DOCUMENTS

| | | | |
|---|---|---|---|
| 2,843,011 | 7/1958 | McLeod et al. | 355/30 |
| 2,855,822 | 10/1958 | Fitter et al. | 355/30 |
| 2,890,621 | 6/1959 | Suits | 355/30 |
| 3,893,763 | 7/1975 | Ott | 355/30 |
| 4,047,804 | 9/1977 | Stephens | 350/164 |
| 4,067,737 | 1/1978 | Lewis | 118/257 X |
| 4,209,250 | 6/1980 | James et al. | 355/30 X |
| 4,480,910 | 11/1984 | Takanashi et al. | 355/30 |
| 4,509,852 | 4/1985 | Tabarelli et al. | 355/75 X |
| 4,528,570 | 7/1985 | Geyer et al. | 355/30 X |
| 4,763,169 | 8/1988 | Jackson | 355/30 |

FOREIGN PATENT DOCUMENTS

| | | |
|---|---|---|
| 2109752 | 4/1972 | Fed. Rep. of Germany . |
| 2085762 | 5/1982 | United Kingdom . |
| 2096537 | 10/1982 | United Kingdom . |

Primary Examiner—Richard A. Wintercorn
Attorney, Agent, or Firm—Sughrue, Mion, Zinn, Macpeak & Seas

[57] ABSTRACT

A method of mounting a transparency for use in an input scanner comprises first inserting a transparency into an envelope. Within the envelope a film of liquid of substantially the same refractive index as the transparency is spread over the transparency. The liquid may be provided in a rupturable pod within the envelope. The transparency holder is sealed by either an integral seal or adhesive tape. The transparency holder protects the transparency from dust and scratches and helps to prevent Newtons rings occuring in the image produced when mounted in the scanner.

11 Claims, 1 Drawing Sheet

FILM TRANSPARENCY HOLDER

FIELD OF THE INVENTION

This invention relates to film transparency holders, for example for use in flat bed scanners.

DESCRIPTION OF THE PRIOR ART

In image scanners using a rotating cylinder where the transparency to be scanned is large enough to handle without a frame, the problems of scratched tranparencies are overcome by taping one edge of the transparency to the drum, interposing a few drops of oil between the drum and the transparency and spreading the oil out over this common surface by applying pressure from the taped end, then taping down the free end to hold it in place. The oil is chosen to have the same refractive index as the transparency so that as it lies between the transparency and the cylinder of the scanner the scratches become invisible. With 35 mm transparencies there are difficulties in handling which make this approach impractical. In particular, problems arise with flat bed scanners, where the problems of dust and scratches are more pronounced, in which the transparency is contained .n a frame for insertion and removal from the scanner. Newtons rings may form where the transparency contacts another surface directly.

U.S. Pat. No. 406,737 describes a method of applying a protective coating to a painting by spreading a liquid resin over the surface and curing it to produce a hardened transparent surface. GB-A-2085762 describes a film unit containing a pod of processing fluid which is discharged by subjecting the unit to pressure.

SUMMARY OF THE INVENTION

In accordance with the present invention, a method of mounting a transparency for use in an input scanner comprises inserting the transparency into an envelope, and spreading a film of liquid over the transparency within the envelope, the liquid having substantially the same refractive index as that of the transparency.

In accordance with a second aspect of the present invention, a film transparency holder comprises a transparent flexible envelope into which a film transparency can be inserted; and a pod of liquid within the envelope, the liquid having substantially the same refractive index as that of the film, the arrangement being such that the pod ruptures when pressurized to release the liquid which can spread between the surfaces of the envelope and the film transparency.

The advantage of this is that it enables small (e.g. 35 mm) transparencies to be easily handled and produces an apparently scratch free transparency which can then be inserted into the flat bed scanner for scanning, possibly supported in a frame. The envelope stiffens and flattens the transparency while oil of chosen refractive index prevents Newtons rings forming which could occur with direct contact of the transparency and an envelope, and it fills in any scratches on the transparency to achieve a better image.

The transparency can advantageously be sealed within the envelope and will thus be protected for storage. Dust that accumulates can easily be cleaned off before use in the scanner, without risking damage to the transparency.

Preferably the seal will be of the type which can be pulled open to remove the transparency. This could take the form of a self-amalgamating tape on the inner surfaces of the opening or a single sided tape which would adhere to the outside of the envelope and of sufficient width to provide a water-tight seal around the opening. Equally a dry seal of the type used for component packets might be satisfactory.

Typically the pod will be an integral part of the fabrication of the envelope although envelopes could be produced into which a pod containing a liquid of an appropriate refractive index can be inserted according to the refractive index of the film to be used.

An example of the liquid to be used is liquid paraffin. The envelope should be made of optically clear and flat material, polyester or acetate would be suitable and the refractive index of the assembly is preferably 1.4 to 1.5.

It is desirable that the film transparency should be contained within an area substantially the same size as itself when the liquid has been released and not be partially obscured by the empty pod. To achieve this some method of fixing the empty pod at one end of the envelope, if it is not an integral part of the envelope, and of holding the inner surfaces of the empty pod together to prevent the film sliding in is required. This can be in the form of heat or pressure seals or adhesive seals. This sealed area of the envelope around the film transparency should obviously be large enough to contain the liquid previously in the pod.

BRIEF DESCRIPTION OF THE DRAWINGS

An example of a film transparency holder according to the present invention will now be described with reference to the accompanying drawings, in which.

EMBODIMENT

Figure 1:
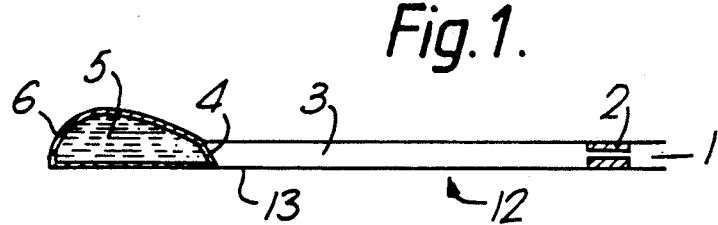
FIG. 1 is a side view of an envelope with integral pod.
Figure 7:
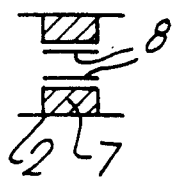
FIG. 7 is a detail of the opening seal.

FIG. 1 shows an envelope 12 which comprises a pod 6 containing a liquid 5 which is joined to the main body 3, in which the transparency will reside, by a rupturable join 4 to the base 13 of the envelope; and has adhesive seals 2. The seals 2 are shown in detail in FIG. 7 and comprise strips of adhesive 7 covered by a release layer 8 which is pulled off by the operator to seal the envelope.

Figure 2:
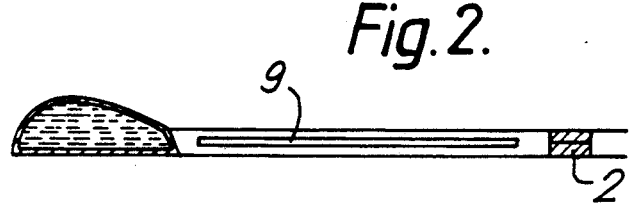
FIG. 2 shows a film transparency sealed into the envelope.

In FIG. 2 the transparency 9 is in place and the opening 1 has been closed by the adhesive seals 2.

Figure 3:
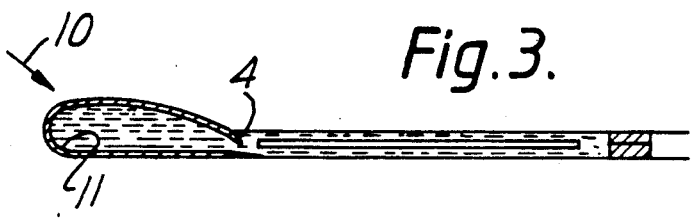
FIG. 3 illustrates the effect of applying pressure to the pod.

Pressure is now applied to an end 10 of the envelope (FIG. 3) containing the pod to force the liquid against the join 4 and cause the join 4 to rupture allowing the liquid to flow throughout the sealed envelope.

Figure 4:
FIG. 4 is a further example of this effect of applying pressure to the pod.
Figure 5:
FIG. 5 shows the envelope after emptying the pod.

If the pod 6 is left at this stage as shown in FIG. 4 the transparency 9 can slide around in the envelope 12 giving problems with alignment. It is therefore desirable that the inner surface 11 of the pod should be lined with a substance which will cause it to seal under pressure thereby restricting the movement of the transparency 9 to its original area 3 as shown in FIG. 5. The surfaces of the envelope containing the transparency will be of the same type and thickness over all parts of the transparency and it will not be partially covered by the layers of the pod section.

The envelope 12 is then mounted in the scanner.

Figure 6:
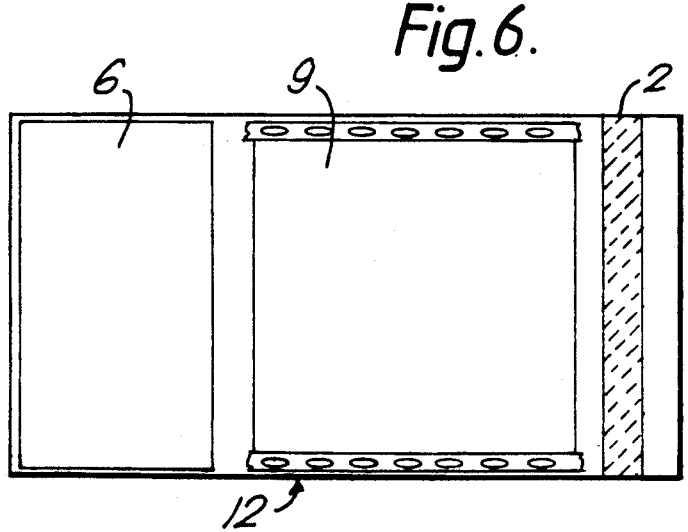
FIG. 6 shows the positions of the pod and film transparency from above.

FIG. 6 shows the transparency 9 in the envelope 12 from above with the pod 6 at the opposite end to the sealable opening 2.

In an alternative arrangement there is no integral seal; simply a piece of contact adhesive sealant e.g. adhesive tape is applied over the open end of the envelope after the liquid has been forced between the transparency and the envelope.

I claim:

1. A method of mounting a transparency for use in an input scanner, the method comprising inserting said transparency into an envelope, and spreading a film of liquid over said transparency within said envelope, said liquid having substantially the same refractive index as that of said transparency.

2. A method according to claim 1, wherein said liquid has a refractive index between 1.4 and 1.5.

3. A method according to claim 1, wherein said envelope is reversibly sealed to maintain said liquid and transparency within said envelope.

4. A method according to claim 1, wherein a rupturable pod is provided within said envelope to contain said liquid.

5. A method according to claim 4, wherein said pod is formed as an integral part of said envelope.

6. A film transparency holder comprising a transparent flexible envelope into which a film transparency can be inserted; and a pod of liquid within said envelope, said liquid having substantially the same refractive index as that of said transparency, the arrangement being such that said pod ruptures when pressurized to release said liquid which can spread between the surfaces of said envelope and said transparency.

7. A holder according to claim 6, wherein a seal is provided for said envelope.

8. A holder according to claim 7, wherein said seal comprises a self-amalgamating tape on the inner surfaces of the opening.

9. A holder according to claim 6, wherein said pod is integrally formed with said envelope.

10. A holder according to claim 6, wherein said envelope is made of optically clear and flat material.

11. A holder according to claim 6, wherein said liquid has a refractive index of between 1.4 and 1.5.

* * * * *